Oct. 9, 1928.
J. A. MARZOLF
1,687,027
AUTOMOBILE JACK
Filed June 20, 1927
2 Sheets-Sheet 1
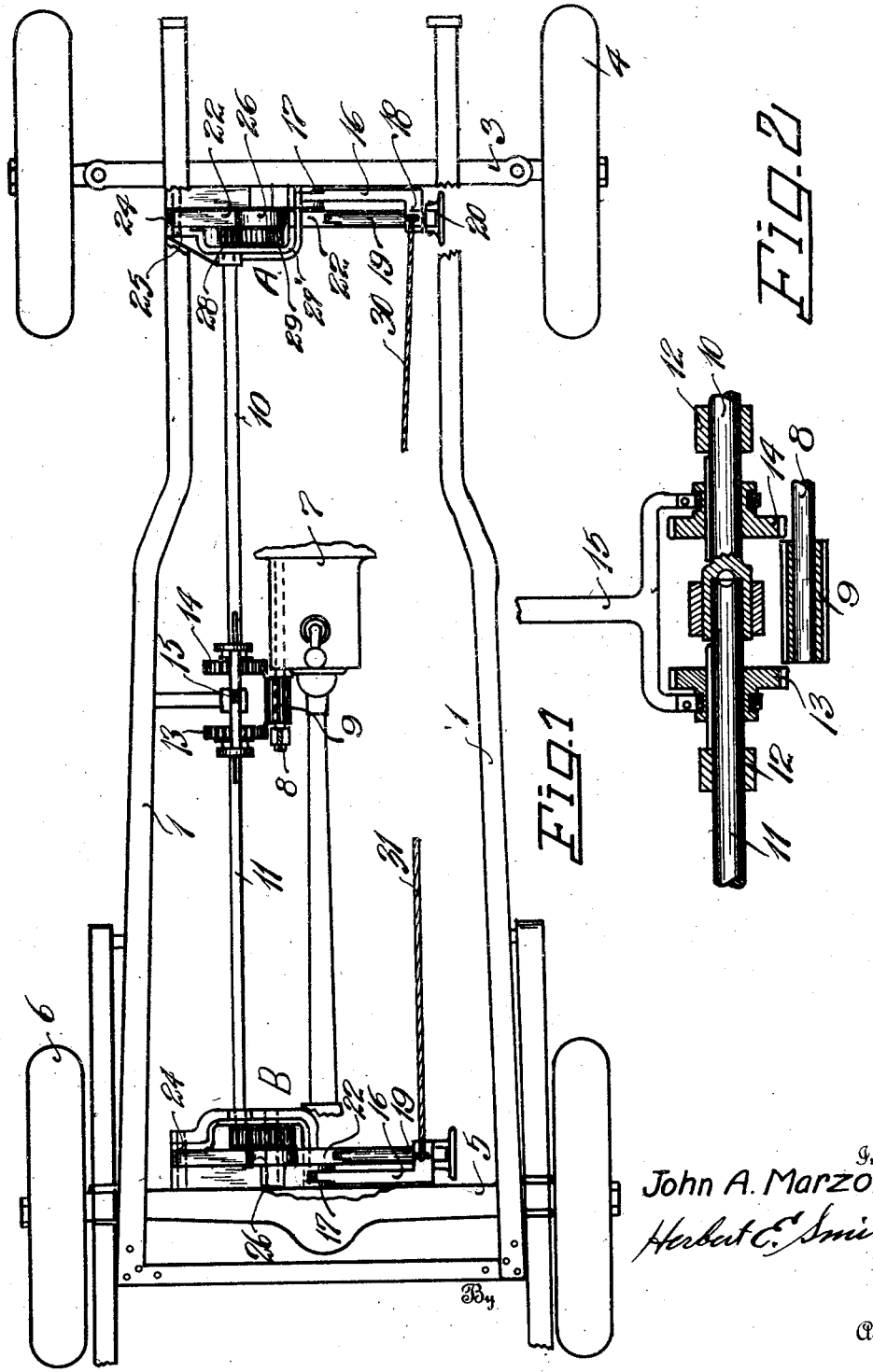
Inventor
John A. Marzolf
Herbert E. Smith
By
Attorney Oct. 9, 1928.  1,687,027
J. A. MARZOLF
AUTOMOBILE JACK
Filed June 20, 1927   2 Sheets-Sheet 2
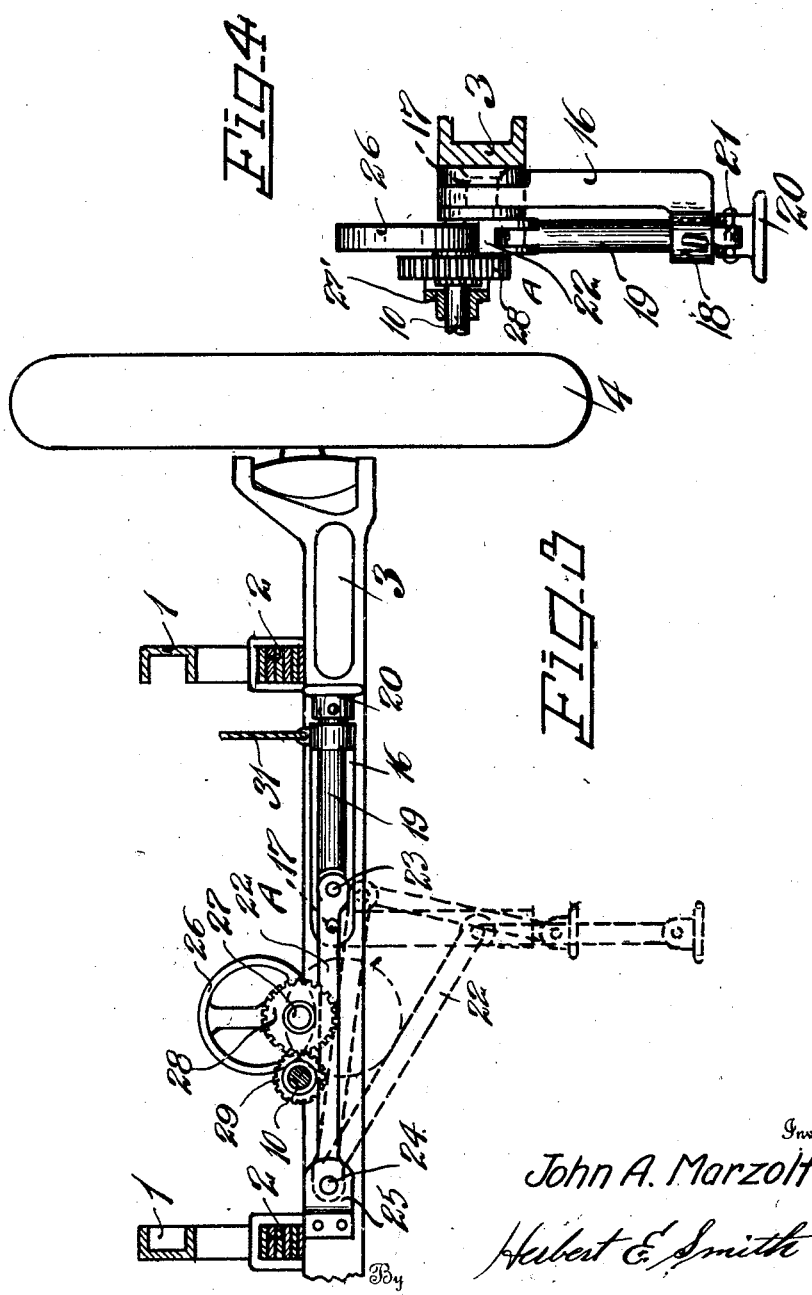
Inventor
John A. Marzolf
Herbert E. Smith
Attorney Patented Oct. 9, 1928.

1,687,027

UNITED STATES PATENT OFFICE.

JOHN A. MARZOLF, OF SEATTLE, WASHINGTON.

AUTOMOBILE JACK.

Application filed June 20, 1927. Serial No. 200,027.

My present invention relates to improvements in automobile jacks of the type employed on and carried by the vehicle. The automobile or automotive vehicle is preferably provided with a pair of jacks, one at the front and one at the rear of the vehicle, and power is supplied or furnished, selectively to these jacks, from the motor of the vehicle.

In carrying out my invention the jacks are preferably supported from the front and rear axles of the vehicle, and located in the longitudinal center of the vehicle, so that a jack may be used to elevate an end of the automobile or vehicle from the ground, for the purpose of making repairs, or for other purposes.

Power is supplied from the motor, and a clutch is used for selectively transmitting the power to either of the jacks, and the operating mechanism of the selected jack is actuated with the power supplied from the motor.

In the accompanying drawings I have illustrated one complete example of the physical embodiment of my invention wherein the parts are combined and arranged according to the best mode I have so far devised for the practical application of the principles of my invention.

Figure 1 is a plan view of so much of an automotive vehicle as is necessary to illustrate the application thereto of my invention.

Fig. 2 is a detail sectional view of the clutch used with the actuating mechanism of the jacks.

Fig. 3 is a detail view in elevation showing a jack at the front of the vehicle, and illustrating by dotted lines the operating condition of the jack, and the position of the jack after it has elevated the front of the vehicle.

Fig. 4 is a detail view in elevation showing the front jack in working position.

In order that the general arrangement and relation of parts may readily be understood, I have shown in Fig. 1 the chassis or frame 1, the springs 2, front axle 3, and front wheels 4. The rear axle 5 is shown with its wheels 6, and in this figure the front jack is designated A and the rear jack is designated B. The two jacks are similar in construction and operation, and the description of one will suffice for both.

The jacks are furnished with power from the usual motor or engine 7 through an auxiliary shaft 8 which is provided with a long pinion 9. At the side of the motor a pair of aligned longitudinally extending actuating shafts 10 and 11 are provided, and supported in bearings 12 located at suitable places for the purpose. These shafts are provided with movable clutch years 13 and 14, and a shift lever 15 may be used to move these gears alternately into engagement with the long pinion 9. Thus if the jack A is to be used the pinion 14 is shifted to engage the pinion 9, and power is transmitted from the driven shaft 8 to the operating shaft 10 for actuating the jack A.

As best seen in Figs. 3 and 4 the two jacks are supported from the respective axes, or other suitable part of the vehicle, and each jack comprises a guide-frame 16, which is pivoted at 17 on the axle so that the frame may swing down from normal horizontal position in Fig. 3, to the working position in Fig. 4, where it is shown in vertical position. This frame 16 is fashioned at its free end with a guide sleeve 18, and the jack bar 19 is retained and guided in this sleeve. The jack bar is provided with a base or foot 20 which is pivoted thereto at 21 in order that the jack bar may readily adjust itself to the surface of the ground or floor upon which it is to be supported. The jack bar is relatively movable in the sleeve 18 and it has a link 22 pivoted to the bar at 23 and pivoted at 24 to a bracket 25 fixed on the axle 3. In normal position the pivot 24 and the pivots 17 and 23 are aligned as indicated in Fig. 3, and in this Figure it will be seen that the pivot points 17 and 23 are offset in order that the link 22 through its pivot 23 may act as a lever for swinging the bar 19 and its frame 16 on the pivot 17. Of course as the jack bar swings there is a pivotal movement at 23 and as a consequence the free end of the bar 19 is projected through the sleeve 18 and the jack rests in the working position as indicated in Fig. 3.

For actuating the operating lever 22 I utilize an eccentric 26 which frictionally engages the lever link on its upper edge as indicated in Fig. 3.

This eccentric or cam wheel is fixed on the eccentric shaft 27 which is journalled in the yoke 27', and located parallel with the operating shaft 10. The eccentric shaft 27 is provided with a large gear 28, and the operating shaft 10 is provided with a smaller pinion 29 in engagement therewith. Thus it will be apparent that when the operating shaft 10 is revolved or turned, the cam shaft 27 is also turned. As the shaft 27 turns the eccentric 26 turns with it and forces the lever link 22 to the successive dotted line positions in Fig. 3. The first dotted line position lowers the jack to working position and then the continued turning of the eccentric causes the front end of the automobile to be elevated in manner well understood.

After the repairs or adjustment have been made and it is desired to lower the end of the vehicle, the motor is thrown into reverse, and the shaft 10 is reversed in its movement. This reverse movement operates the eccentric 26, and the vehicle due to gravity moves to normal position. Each jack is provided with a rope or cable as 30 and 31, and these cables are attached to the guide sleeves 18. By means of the cables the jack may be pulled to normal position, and then the cable is secured to hold the jack in the normal horizontal position of Fig. 3.

It will be understood that the jack B is operated through the operating shaft 11 in the same manner that the jack A is operated, and therefore a description of this operation is not necessary.

Having thus fully described my invention what I claim as new and desire to secure by Letters Patent is:

1. In an automobile jack the combination with a pivoted jack and its lever link, of an eccentric for frictional engagement with said link, and means for operating said eccentric, for the purpose described.

2. The combination in an automobile jack with an axle of a pivoted guide frame and a jack bar guided in said frame, a lever link pivoted to said axle and to said jack bar, an eccentric shaft and an eccentric disk thereon engaging the lever link, an operating shaft, a motor, and transmission mechanism between the motor and the operating shaft, for the purpose described.

In testimony whereof I affix my signature.

JOHN A. MARZOLF.